(12) United States Patent
Leah et al.

(10) Patent No.: US 10,003,080 B2
(45) Date of Patent: Jun. 19, 2018

(54) PROCESS FOR FORMING A METAL SUPPORTED SOLID OXIDE FUEL CELL

(71) Applicant: Ceres Intellectual Property Company Limited, Horsham (GB)

(72) Inventors: Robert Leah, Horsham (GB); Mike Lankin, Horsham (GB); Robin Pierce, Horsham (GB); Adam Bone, Horsham (GB)

(73) Assignee: CERES INTELLECTUAL PROPERTY COMPANY LIMITED, West Sussex (GB)

( * ) Notice: Subject to any disclaimer, the term of this patent is extended or adjusted under 35 U.S.C. 154(b) by 181 days.

(21) Appl. No.: 14/053,216

(22) Filed: Oct. 14, 2013

(65) Prior Publication Data
US 2015/0064596 A1 Mar. 5, 2015

(30) Foreign Application Priority Data
Sep. 4, 2013 (GB) .................................. 1315744.1

(51) Int. Cl.
*H01M 4/88* (2006.01)
*H01M 4/90* (2006.01)
*H01M 8/1213* (2016.01)
*H01M 8/124* (2016.01)

(52) U.S. Cl.
CPC ....... *H01M 4/8828* (2013.01); *H01M 4/8803* (2013.01); *H01M 4/8825* (2013.01); *H01M 4/8885* (2013.01); *H01M 4/8896* (2013.01); *H01M 4/9033* (2013.01);
(Continued)

(58) Field of Classification Search
None
See application file for complete search history.

(56) References Cited

U.S. PATENT DOCUMENTS

| | | | |
|---|---|---|---|
| 5,908,713 A * | 6/1999 | Ruka et al. .................. 429/484 |
| 6,709,628 B2 | 3/2004 | Kleinlogel | |
| 7,014,942 B2 | 3/2006 | Gorte | |

(Continued)

FOREIGN PATENT DOCUMENTS

| | | | |
|---|---|---|---|
| CN | 1409427 A * | 4/2003 | |
| EP | 1702376 | 2/2004 | |

(Continued)

OTHER PUBLICATIONS

International Search Report for corresponding PCT Application No. PCT/GB2014/052546 dated Dec. 1, 2014, 4 pages.

(Continued)

*Primary Examiner* — Sarah A. Slifka
*Assistant Examiner* — Haroon S Sheikh
(74) *Attorney, Agent, or Firm* — Snell & Wilmer L.L.P.

(57) ABSTRACT

A process for forming a metal supported solid oxide fuel cell is provided. The process can include the steps of: a) applying a green anode layer including nickel oxide and a rare earth-doped ceria to a metal substrate; b) prefiring the anode layer under non-reducing conditions to form a composite; c) firing the composite in a reducing atmosphere to form a sintered cermet; d) providing an electrolyte; and e) providing a cathode; wherein the reducing atmosphere comprises an oxygen source, a metal supported solid oxide fuel cell formed during this process, fuel cell stacks and the use of these fuel cells.

17 Claims, 13 Drawing Sheets

(52) U.S. Cl.
CPC .. *H01M 8/1213* (2013.01); *H01M 2008/1293* (2013.01); *H01M 2300/0071* (2013.01)

(56) References Cited

U.S. PATENT DOCUMENTS

| | | | |
|---|---|---|---|
| 7,855,003 B2 | 12/2010 | Arico | |
| 8,039,175 B2 | 10/2011 | Linderoth et al. | |
| 2004/0195091 A1* | 10/2004 | D'Astolfo, Jr. | 204/280 |
| 2005/0227133 A1 | 10/2005 | Gorte | |
| 2008/0070084 A1 | 3/2008 | Ishihara | |
| 2008/0096079 A1* | 4/2008 | Linderoth | B22F 7/008 429/482 |
| 2008/0107948 A1 | 5/2008 | Yamanis | |
| 2008/0254336 A1 | 10/2008 | Batawi | |
| 2010/0098996 A1 | 4/2010 | Hwang | |
| 2011/0091794 A1 | 4/2011 | Lee | |
| 2012/0009507 A1* | 1/2012 | Wood et al. | 429/535 |
| 2012/0021332 A1 | 1/2012 | Hwang | |
| 2012/0121999 A1 | 5/2012 | Laurencin et al. | |
| 2012/0186976 A1 | 7/2012 | Laucournet et al. | |
| 2013/0108943 A1 | 5/2013 | Yamanis et al. | |

FOREIGN PATENT DOCUMENTS

| | | |
|---|---|---|
| GB | 2 368 450 A | 5/2002 |
| GB | 2 386 126 A | 9/2003 |
| GB | 2 400 486 A | 10/2004 |
| GB | 2 456 445 A | 7/2009 |
| KR | 20130079153 | 7/2013 |
| WO | WO 00/39864 | 7/2000 |
| WO | 2005064717 | 7/2005 |
| WO | WO 2007/044045 | 4/2007 |
| WO | 2007104329 | 9/2007 |
| WO | 2008121128 | 10/2008 |
| WO | 2010066444 | 6/2010 |
| WO | WO 2011096939 A1 * | 8/2011 |

OTHER PUBLICATIONS

Search Report for GB 1315744.1, UK Intellectual Property Office, dated Feb. 25, 2014, 1 page.
Notice of Allowability for U.S. Appl. No. 14/053,301 dated Sep. 25, 2015.
Non-Final Office Action for U.S. Appl. No. 14/992,531 dated Feb. 27, 2017.
Final Office Action for U.S. Appl. No. 14/992,531 dated Sep. 1, 2017.
Non-Final Office Action for U.S. Appl. No. 14/992,531 dated Jul. 11, 2016.
The Written Opinion of the International Searching Authority for International Application No. PCT/GB2014/052546 dated Dec. 1, 2014.
The International Preliminary Report on Patentability for International Application No. PCT/GB2014/052546 dated Mar. 8, 2016.
Search Report for GB1315746.6, UK Intellectual Property Office, dated Feb. 25, 2014.
The International Search Report for International Application No. PCT/GB2014/052546 dated Dec. 1, 2014.
The International Preliminary Report on Patentability for International Application No. PCT/GB2014/052549 dated Mar. 17, 2016.
The Written Opinion of the International Searching Authority for International Application No. PCT/GB2014/052549 dated Mar. 4, 2016.
The International Search Report for International Application No. PCT/GB2014/052549 dated Nov. 11, 2014.
Notice of Allowance for U.S. Appl. No. 14/992,531 dated Jan. 16, 2018.
Corrected Notice of Allowance for U.S. Appl. No. 14/992,531 dated Feb. 9, 2018.

* cited by examiner

Figure 13

| Test type | Anode type | Mean pull-off pressure/ MPa | Number of cells tested* |
|---|---|---|---|
| As manufactured | Standard NiO/CGO10 | 14.0 | 19 |
| As manufactured | Reduced Fire NiO/CGO10 | >17 | 5 |
| After test operating | Standard Ni/CGO10 | 6.7 | 21 |
| After test operating | Reduce fired Ni/CGO10 | 16.4 | 6 |

* 5 measurements per cell

PROCESS FOR FORMING A METAL SUPPORTED SOLID OXIDE FUEL CELL

FIELD

The invention relates to a process for forming a metal supported solid oxide fuel cell (SOFC), and to fuel cells formed in this way. In particular, the invention relates to a process of anode formation in order to provide a more robust fuel cell.

BACKGROUND

A SOFC is an electrochemical device for the generation of electrical energy through the electrochemical oxidation of a fuel gas (usually hydrogen-based). The device is generally ceramic-based, using an oxygen-ion conducting metal-oxide derived ceramic as its electrolyte. As most ceramic oxygen ion conductors (for instance, doped zirconium oxide or doped cerium oxide) only demonstrate technologically relevant ion conductivities at temperatures in excess of 500° C. (for cerium-oxide based electrolytes) or 600° C. (for zirconium oxide based ceramics), SOFCs operate at elevated temperatures.

In common with other fuel cells, SOFCs include an anode where fuel is oxidised, and a cathode where oxygen is reduced. These electrodes must be capable of catalysing the electrochemical reactions, be stable in their respective atmospheres at the temperature of operation (reducing on the anode side, oxidising on the cathode side), and be able to conduct electrons so the electric current generated by the electrochemical reactions can be drawn away from the electrode-electrolyte interface.

Finding materials with the relevant combination of properties for the anode has, in spite of extensive research, proved difficult. For many years, the state-of-the-art SOFC anode has consisted of a porous ceramic-metal (cermet) composite structure, with nickel as the metallic phase and an electrolyte material (usually yttria or Scandia-stabilised zirconia) as the ceramic phase, although less commonly a doped ceria-based electrolyte material such as gadolinia or samaria-doped ceria have also been used. In this structure, the nickel performs the role of catalyst, and the volume fraction of nickel is high enough that a contiguous metal network is formed, thus providing the required electronic conductivity. The electrolyte material forms a contiguous ceramic backbone to the anode, providing mechanical structure, enhancing the bond between the anode and the electrolyte and also extending the anode-electrolyte interfacial region some distance into the anode.

A well-known limitation of these cermet anodes is that at cell operating temperature the metallic nickel in the anode is only stable in a reducing atmosphere. This is normally provided by the fuel gases, so under normal operation the anode is stable. However, should the supply of fuel gas be interrupted with the SOFC at operating temperature, the atmosphere within the anode will become oxidising. Under these conditions the metallic nickel will oxidise back to nickel oxide. This oxidation is associated with a volume increase of greater than approximately 40% because the metallic nickel which has been formed by the reduction of sintered nickel oxide does not oxidise back to the same morphology as the original nickel oxide from which it was formed. Instead it generates mesoporosity, occupying a larger volume than the original nickel oxide. This volume change on reoxidation can generate large stresses in the anode structure, which in turn can result in cracking of the anode and potential destruction of the SOFC cell.

The inability of many SOFC cells to undergo multiple reduction-oxidation (REDOX) cycles without suffering damage of this type has been a major factor inhibiting the widespread commercial adoption of SOFC technology for power generation, as SOFC systems generally require the presence of complex and expensive purge gas systems to maintain a reducing atmosphere over the anodes in the event of an unexpected fuel interruption, for example due to a failure elsewhere in the system which requires an emergency shutdown of the system for safety reasons.

The problem of inadequate REDOX stability is particularly acute in anode supported fuel cells, currently the most common form of SOFC cell. Anode support is beneficial as it allows a very thin (<20 µm) layer of electrolyte (such as stabilised zirconia) to be used, as the electrolyte is non-structural. This in turn allows operation at a lower temperature range than is the case for electrolyte supported cells (650 to 800° C. rather than 850 to 1000° C.). Because the resistance of the electrolyte to oxygen ion transport is inversely proportional to the electrolyte thickness, in electrolyte supported fuel cells, the resistance caused by the thickness of the electrolyte layer is overcome by increasing operation temperatures, exploiting the exponential drop off in resistance with temperature. As thinner layers can be used in anode supported cells, operation temperatures can be reduced, which is generally desirable as it facilitates the use of lower-cost materials in the SOFC system, and reduces the rate of various material degradation mechanisms such as the oxidation of metallic components.

In spite of these advantages, as the anode is the structural support of the SOFC cell in an anode-supported cell, the cells are very prone to catastrophic failure on repeated REDOX cycling, as stress-induced cracking can result in the cell completely breaking up.

In spite of considerable efforts by developers, no alternative to nickel has achieved widespread adoption, as no suitable material has yet been developed which combines nickel's relatively low cost, high catalytic activity for both electrochemical oxidation of hydrogen and steam reforming of hydrocarbon fuel feeds and high electronic conductivity.

There are factors relating to the design of the SOFC which can help mitigate the damaging effects of REDOX cycling, these include:

Not using an anode supported cell—the anode can therefore be thinner; reducing the overall volume change through REDOX cycling and the danger of catastrophic cracking.

Operating at a lower temperature—the rate of nickel oxidation increases exponentially with increasing temperature, starting at >300° C. The lower the temperature of operation, the less risk of nickel oxidation and volume expansion. Further, nickel particles tend to oxidise though a core-and-shell mechanism, where the outer surface oxidises rapidly, but then the core of the particle oxidises more slowly as this is diffusion limited. Thus at lower temperatures, it is likely that only the outer surface of the nickel particles in the anode will reoxidise, not the entire particle and any volume change will be reduced.

Provide the anode with a contiguous ceramic 'backbone'—As the electrolyte-based ceramic phase used in SOFC anodes is largely unaffected by changes in oxygen partial pressure, this part of the anode will not change volume during REDOX cycles affecting the nickel phase. Thus the structural integrity of the anode and its bond to the electrolyte will be enhanced if there is a sintered porous ceramic network within the anode.

A design of SOFC cell which has the potential to meet these criteria is the metal-supported SOFC design disclosed by the applicant in GB 2 368 450. This SOFC cell uses a ferritic stainless steel foil as a structural support. The foil being made porous in its central region to allow fuel access to the anode. The active cell layers (anode, electrolyte and cathode) are all deposited on top of the substrate foil as films. This means the anode only needs to be around 15 µm thick as it is not the structural support for the cell. This cell also allows operation at temperatures in the range 450 to 650° C., much lower than standard operating temperatures. This is achieved through the use of predominantly cerium oxide (ceria)-based ceramic materials such as CGO10 (gadolinium doped-cerium oxide, for CGO 10-$Ce_{0.9}Gd_{0.1}O_{1.95}$) as the oxygen ion conducting electrolyte, which have an intrinsically higher oxygen ion conductivity than zirconia-based materials. A thin film of stabilised zirconia is deposited in the electrolyte to prevent internal short-circuiting of the cell due to the mixed ionic-electronic conductivity of ceria-based electrolytes, as disclosed in GB 2 456 445, but as the zirconia layer is so thin, its resistance to oxygen ion transport is sufficiently low that low-temperature operation is not prevented. The SOFC cell of GB 2 368 450 uses a porous metal-CGO10 composite cermet anode fabricated as a thick film with a thickness between 5 and 30 µm. The anode is generally deposited by screen-printing an ink containing metal oxide and CGO10 powders and formed into a porous ceramic layer by thermal processing to sinter the deposited powders together to form a contiguous structure bonded to the steel substrate.

A limitation imposed by the deposition of the ceramic layers onto a ferritic stainless steel support by conventional ceramic processing methods is the maximum temperature to which the steel may be exposed in an oxidising atmosphere due to the formation of a chromium oxide scale at high temperatures in an oxidising atmosphere. This upper limit is substantially below the 1200 to 1500° C. typically used when sintering ceramics and so methods have been developed for sintering rare earth-doped ceria electrolytes to >96% of theoretical density at <1100° C., facilitating the formation of the gas-tight layer desired (GB 2 368 450, GB 2 386 126 and GB 2 400 486).

Surprisingly, sintering a nickel oxide-rare earth-doped ceria composite anode at these temperatures has proved more difficult than sintering the electrolyte. This is because composites of two different oxide materials have been found to sinter more poorly than a single phase material. Thus nickel oxide or the ceramic alone will sinter adequately at these temperatures, but as a composite sintering in air can be poor, leading to weak necks between particles and a weak ceramic structure. This can result in cell failure as a result of REDOX cycling, as the weak bonds between nickel particles break as a result of the volume changes during the REDOX cycle. This can ultimately result in the catastrophic failure of the cell through delamination of the electrolyte from the anode.

Vieweger et al. (*Thin Electrolytes on Metal-Supported Cells*. S. Vieweger, R Muecke, N. Menzler, M. Ruettinger, Th. Franco and H. Buchkremer. Lucerne: s.n., 2012. Proceedings of the 10th European SOFC forum. Vol. Chapter 7, pp. 13/109-19/109) and Rodriguez-Martinez et al. (*Tubular metal supported solid oxide fuel cell resistant to high fuel utilisation*. L. Rodriguez-Martinez, L. Otaegui, A. Arregi, M. Alvarez an I. Villareal. Lucerne: s.n., 2012. Proceeding of the 10th European SOFC forum. Vol. Chapter 7, pp. 39/109-48/109) have avoided these issues by firing the ceramic layers onto the metal support in a strongly reducing atmosphere, usually a mixture of hydrogen and an inert gas such as nitrogen or argon. The reducing atmosphere avoids excessive oxidation of the steel, allowing higher processing temperatures more typical of those used in conventional ceramic processing to be used. However the use of such an atmosphere has a number of drawbacks for metal supported SOFCs of the type disclosed in GB 2 368 450:

Method inappropriate for use with ceria-based electrolytes—which cannot be fired in a strongly reducing atmosphere, as the volume expansion associated with the reduction of $Ce^{4+}$ ions to $Ce^{3+}$ ions at high temperature generates mechanical stresses sufficient to crack the electrolytes.

The reducing atmosphere means the anodic nickel is present as nickel metal—which tends to sinter excessively at >1100° C., resulting in an anode with inadequate porosity and poor electrochemical performance due to low catalytic surface area at the anode-electrolyte interface.

Interdiffusion of nickel—at high temperatures in a reducing atmosphere, there tends to be extensive interdiffusion of nickel from the anode with ions from the support (where the support is steel, typically with iron ions). This can result in an unstable anode containing a high percentage of metals, such as iron, other than the nickel, and regions of the support where the presence of nickel in the support causes the formation of an austenitic phase in the support, the austenitic phase having a much higher coefficient of thermal expansion (CTE).

Limited choice of cathode materials—most SOFC cathode materials cannot be sintered in a reducing atmosphere as they are usually mixed metal oxide materials which tend to reduce and decompose irreversibly into their constituent oxides and/or native metals under these conditions. As such, even if the anode and electrolyte are sintered in a reducing atmosphere, the cathode must be sintered in air. Exposing the nickel in the anode to air will cause it to reoxidise.

In view of the problems with the sintering of anodes in strongly reducing atmospheres, alternative approaches have been tried, for instance, porous (usually zirconia-based) ceramic structures have been sintered between the metal support and the electrolyte (M. C. Tucker, T. Z. Sholklapper, G. Y. Lau, L. C. DeJonghe and S. J. Visco. 2009. ECS Proc. Vol. 25(2), p. 681). This allows for the ceramic to be fired in a reducing atmosphere as it contains no nickel. The nickel content which should be present for the anode to function can be added post-electrolyte sintering by infiltration of the porous ceramic network with a solution of nickel salts, followed by thermal decomposition to form nickel oxide. However, the infiltration step, whilst allowing the use of a reducing atmosphere during sintering, may be difficult to scale up to industrial production because of the requirement for multiple infiltration, drying and decomposition steps in order to deposit the >20 volume % nickel into the porous ceramic structure required to form an electronically conductive network. As a further issue, the very high surface area nickel oxide formed by low-temperature decomposition of metal salts tends to readily sinter as nickel metal under typical SOFC operating conditions, leading to the potential for loss of catalytic activity and/or electronic conductivity, both of which can lead to rapid cell performance degradation.

An approach tested by McKenna et al. (*Advances in Metal Supported Cells in the METSOFC EU Consortium*. B.

McKenna, N. Chriistiansen, R. Schauperl, P. Prenninger, J. Nielsen, P. Blennow, T. Klemenso, S. Ramousse, A. Kromp and A. Weber. Lucerne: s.n., 2012. Proceedings of the 10th European SOFC forum. Vol. Chapter 7, pp. 20/109-29/109) requires the formation of the anode structure as a cermet of zirconia and powdered stainless steel, co-sintered in a reducing atmosphere. The stainless steel acts as the electronically conductive network of the anode, meaning that a much smaller amount of nickel needs to be post-infiltrated into the network to act as an electrocatalyst. Whilst this approach can work, there are risks of anode poisoning due to the very close proximity of the catalytically active part of the anode and the chromium-containing stainless steel. The support is also potentially vulnerable to corrosion of the stainless steel particles if they are not fully coated with a passivating chromium oxide scale.

It would therefore be advantageous to provide for a method of preparing a metal-supported SOFC in which the anode is stable to REDOX cycling, robust to a loss of reducing atmosphere at operating temperature, and yet can be made using commercially viable production methods, ideally without degradation of the other components of the fuel cell during manufacturing. The invention is intended to overcome or ameliorate at least some aspects of these problems.

SUMMARY

Accordingly, in a first aspect of the invention there is provided a process for forming a metal supported solid oxide fuel cell, the process comprising the steps of:
a) applying a green anode layer including nickel oxide and a rare earth-doped ceria to a metal substrate;
b) prefiring the anode layer under non-reducing conditions to form a composite;
c) firing the composite in a reducing atmosphere to form a sintered cermet;
d) providing an electrolyte; and
e) providing a cathode;
wherein the atmosphere comprises an oxygen source.

The firing of the composite in a reducing atmosphere to form a sintered cermet inherently includes a reduction of the nickel oxide to nickel metal—without this a cermet is not formed. This step of forming nickel metal in a reducing atmosphere, yet in the presence of an oxygen source, provides for a firing process in which nickel metal is formed, and can be sintered, yet in which the oxygen partial pressure remains sufficiently high that the metal substrate remains stable, and any oxide passivation layer which has formed on the surface of the substrate is not reduced. Further, as the reducing atmosphere leads to reduction of the nickel oxide to nickel during firing, and importantly before the electrolyte is provided, the volume change of the anode is reduced during first use. This decreases the chances of the electrolyte and anode cracking in use, due to expansion of the anode at the electrolyte-anode interface. As such, by preventing the degradation of the metal support during manufacture of the SOFC, and pre-reducing the nickel during firing of the composite, the SOFC produced using the process claimed is highly robust.

It may be that the reducing atmosphere of firing step c) comprises an inert gas, a gaseous reducing agent and a gaseous oxygen source. The inert gas being one of many carrier gases well know to the skilled reader, for instance a noble gas such as argon, or nitrogen, both of which are popular because of their ready availability and low cost. Often argon will be used either alone or in combination with nitrogen. The reducing agent may be selected from hydrogen, carbon monoxide and combinations thereof. Often hydrogen will be used because of its low toxicity. The gaseous oxygen source may be selected from carbon dioxide, water vapour and combinations thereof. The oxygen source is present to buffer the reducing atmosphere and provide a predictable oxygen partial pressure, often water vapour will be used because it is easy and inexpensive to obtain and work with, however, carbon dioxide may also be used.

The use of a reducing gas mixture during the firing step, which is buffered by the addition of an oxygen source (such as water vapour or carbon dioxide) to the reducing agent/inert gas mixture means that at elevated temperatures, the partial pressure of oxygen is buffered in a defined range, due to the thermodynamic equilibria of reactions (1), (2) and (3), some or all of which will apply depending on the oxygen source and reducing agent used.

$$H_2 + \frac{1}{2}O_2 \leftrightarrow H_2O \quad (1)$$

$$H_2 + CO_2 \leftrightarrow CO + H_2O \quad (2)$$

$$CO + \frac{1}{2}O_2 \leftrightarrow CO_2 \quad (3)$$

As equations (1) and (3) are combustion reactions, and thus strongly exothermic, the thermodynamic equilibrium is well over to the right. However, the reverse reaction occurs to a non-negligible extent in a mixture of reactants and products, and thus there is always a non-zero oxygen partial pressure in these gas mixtures. The oxygen partial pressure is also fairly constant at a given temperature and gas mixture as the equilibrium position will shift in reactions (1) or (3) to compensate should oxygen be generated or consumed in the reaction.

As noted above, the function of the reducing atmosphere as defined is to maintain a firing atmosphere which is sufficiently reducing that the nickel in the anode is maintained in its metallic state, and the rare earth-doped ceria in the anode is maintained in a partially reduced state at the firing temperature. However the oxygen partial pressure is sufficiently high that the passivation layer protecting the metal substrate (for instance thermally-grown chromium oxide protecting a ferritic stainless steel substrate) is not reduced back to metal. If the atmosphere claimed is not used, it has been shown that the atmosphere immediately adjacent to the metal substrate becomes so reducing that the oxide scale either reduces or evaporates off the metal substrate, leaving unprotected metal beneath. Without the oxide scale acting as a barrier between the nickel in the anode and the metal substrate, extensive interdiffusion of metal occurs between the substrate and anode. This results in significant amounts of contamination (often, where steel is used in the form of iron oxide) being present in the anode during subsequent firing steps, and, where steel is used, distortion of the substrate due to the formation of an austenitic phase within the steel. This distortion occurs as the austenitic phase has a much higher coefficient of thermal expansion than the rest of the substrate.

Often, the reducing atmosphere of firing step c) will comprise in the range 0.01 to 50 volume % of the oxygen source, often in the range 0.2 to 10 volume %, or 0.5 to 3 volume % of the oxygen source. It will therefore be the case that in many examples the oxygen source will be only a small component of the reducing atmosphere of this step, with only enough of the oxygen source being present to provide a partial pressure of oxygen such as to prevent reduction of any passivation layers present on the metal substrate and consequent degradation of the substrate during firing of the anode without the oxygen partial pressure being high enough to prevent nickel oxide reduction.

Where the oxygen source is water vapour this may conveniently be added to the reducing atmosphere by bubbling the combination of the reducing agent and inert gas through a water bath, saturating the gas mixture with water vapour.

Often the reducing agent will be present in the reducing atmosphere in the range 0.5 to 50 volume %, often 1 to 10 volume %, often 2 to 5 volume %. The presence of the reducing agent at these often low levels is sufficient to ensure reduction of nickel oxide to metallic nickel, and sintering of the nickel. As metallic nickel sinters more effectively at the temperature of firing than nickel oxide, and is highly ductile, it will flow around the rare earth-doped ceria during sintering of the ceria, ensuring good sintering of the rare earth-doped ceria, and good mixing of the sintered nickel and rare earth-doped ceria within the strong porous cermet formed. Further, where the reducing agent is hydrogen, it can be beneficial to operate with a hydrogen concentration of 5% or less as this means the atmosphere is considered non-flammable.

It may be, therefore, that the oxygen partial pressure in the reducing atmosphere of step c) is in the range $10^{-14}$ to $10^{-22}$ bar (1 bar=100 kPa), often in the range $10^{-15}$ to $10^{-21}$ bar, or $10^{-17}$ to $10^{-19}$ bar, as it has been found that at these partial pressures of oxygen, at the temperatures typically used for firing the anode, the formation of nickel metal and chromium oxide are favoured. This provides for the required reduction of nickel oxide to nickel metal, allowing for the formation of the electroactive layer; but also ensures that the passivation layer is retained, at least for SOFCs where the support is ferritic stainless steel, the most commonly used metallic support.

As described above, the formation of the cermet in firing step c) will inherently include the reduction of the nickel oxide to nickel metal, this may be at any point in the sintering process, such that the reduction of nickel oxide to nickel may be under conditions where all or substantially all of the nickel oxide is reduced to nickel prior to sintering; or it may be that the conditions for sintering nickel oxide are provided before reduction to nickel begins, in this case, as nickel metal has a higher sintering activity than nickel oxide, the nickel oxide will begin to sinter, and when formed the nickel metal will follow suit.

As used herein expressions such as "fully" and "all" with reference to the reduction of the nickel oxide to nickel metal, and the degree of sintering, are intended to be given their normal meanings as construed by the person skilled in the art, such that there may be a small percentage of nickel oxide present, when "all" the nickel oxide has been reduced, but within the accuracies of the process the reduction is regarded as complete. Further, the reduction of nickel oxide to nickel may be substantially fully complete, or mostly fully complete, for instance the reduced nickel may be present in the range 95-99.9 wt % nickel, perhaps 98-99.5 wt % nickel, perhaps 99 to 99.5 wt %.

It is possible to modify the reaction conditions to control the reduction of nickel oxide relative to the sintering of the nickel containing materials. For instance, the furnace temperature could be gradually increased to sintering temperature, such that the nickel oxide is fully reduced to nickel metal before the minimum temperature for sintering is reached. Alternatively, it may be that the furnace is rapidly heated to the reduction temperature for nickel oxide (for instance, in the range 300° C. to 450° C.), then held at this temperature until full reduction occurs before rapid heating to the sintering temperature. As such, there is provided a process wherein in firing step c) the nickel oxide is reduced to nickel metal prior to sintering. These methods provide for full reduction of nickel oxide to nickel before sintering, and are believed to cause less stress to the anode, and result in less cracking, than where nickel oxide is sintered prior to reduction.

Alternatively, the sample may be heated in air, an inert atmosphere or a reducing atmosphere to the sintering temperature of nickel oxide, so that the nickel oxide begins to sinter before full reduction to nickel metal (or any reduction where the atmosphere is non-reducing). Where air or an inert atmosphere is used, at the sintering temperature for nickel oxide, the reducing atmosphere would be introduced, to allow for reduction of the nickel oxide to nickel and to further promote sintering of the cermet. As such, there is provided a process wherein in firing step c) the nickel oxide is at least partially sintered prior to reduction to nickel metal, although full sintering is also possible. The rare earth-doped ceria will sinter when the appropriate temperature is reached.

The first step of the process as herein described is the application of a green anode layer to the metal substrate, typically the metal substrate will be a stainless steel substrate, in particular a ferritic stainless steel substrate, as ferritic stainless steel forms a chromium oxide surface passivation layer when heated. As used herein, the terms "support" and "substrate" as referring to the metal support/substrate are intended to be used interchangeably. The formation of a chromium oxide passivation layer, as opposed to aluminium oxide or silicon oxides commonly formed with other heat resistant steels, has the benefit that chromium oxide is an electronic semi-conductor at high temperatures, rather than being insulating, making the ferritic stainless steel suitable for use in fuel cell applications. The ferritic stainless steel may be an aluminium free ferritic stainless steel, such as a ferritic stainless steel containing titanium and/or niobium as stabilisers. Often the ferritic stainless steel will comprise from about 17.5 to 23 wt % Cr. In particular, the ferritic stainless steel may be selected from European designation 1.4509 (17.5 to 18.5 wt % Cr) and/or European designation 1.4760 (22 to 23 wt % Cr), although similar designations of ferritic stainless steel may also be used, as would be understood by the person skilled in the art.

The substrate may have a thickness in the range about 50 to 500 µm, often about 50 to 400 µm, in some cases about 200 to 350 µm. The thickness of the substrate is determined by the need to provide a stable substrate, which doesn't warp during cell formation or in use, yet which is as thin as possible to allow efficient contact between the fuel and the anode. As described in GB 2 368 450, this contact can be achieved with excellent results by the provision of a porous region bounded by a non-porous region of the substrate, over which the anode is formed. It will often be the case that the porous region of the substrate includes a plurality of through apertures fluidly interconnecting the one and other surface of the substrate, often these will be uniformly spaced, additionally or alternatively having a lateral dimension of from about 5 to 500 µm, or from about 100 to 300 µm. Further, the apertures may comprise from about 0.1 to 5 area % of the porous region of the substrate or from about 0.2 to 2 area % of the porous region of the substrate. Each of these features contribute to an efficient transfer of fuel through the substrate to the anode, whilst allowing the metal substrate to support the fuel cell, facilitating the use of dramatically reduced thicknesses of the electrochemically active layers within the cell.

Typically the substrate will be a foil, although a sintered substrate could also be used. The advantage of foils is the ease of control of the structure of the porous region.

The green anode layer is generally formed by application of an ink comprising the nickel oxide and rare earth-doped ceria, although other methods may be used. These two components will generally be suspended as powders within an ink base, the ink base generally comprising one or more volatile solvents, one or more dissolved non-volatile polymer binders, dispersants, wetting agents and other common ink components, and the nickel oxide and rare earth-doped ceria will often be of particle size distribution d90 in the range 0.1 to 4 µm, or 0.2 to 2 µm or 0.7 to 1.2 µm. Whilst the particle size distributions, and sizes themselves, of the nickel oxide and rare earth-doped ceria may be different, it can be beneficial if they are the same, or similar, as this helps to facilitate good mixing of the powders and hence strong sintering of the anode. Small particle sizes are generally selected as these are more easily suspended in the ink, and offer a greater homogeneity of components within the anode layer, and have a higher surface area to volume ratio, increasing the reactivity of the particles and ease of sintering.

Typically, the ink will contain in the range 30 to 70 wt % of the solids content in the ink of nickel oxide. Often, this will be 35 to 45 wt %, the remainder of the solids being the rare earth-doped ceria. That is to say, it will often be the case that the only solids in the ink will be the metal oxides and the rare earth-doped ceria, and as such it will often also be the case that the anode consists of, or consists essentially of, nickel oxide and the rare earth-doped ceria.

In many examples, the rare earth-doped ceria will have the formula $Ce_{1-x}RE_xO_{2-x/2}$, where RE is a rare earth and $0.3 \geq x \geq 0.05$. Often, the rare earth-doped ceria will be gadolinium doped cerium oxide, often of the formula $Ce_{0.9}Gd_{0.1}O_{1.95}$ (CGO10). These compounds are generally used as they have a higher oxygen ion conductivity than many electrolyte materials, including zirconia-based materials; thereby allowing operation of the fuel cell at lower temperatures than conventional SOFCs, the temperature of operation of the fuel cell of the invention typically being in the range 450 to 650° C., often 500 to 620° C. Operating the fuel cell at lower temperatures has a number of benefits, including reduced rate of oxidation of nickel in non-reducing atmospheres, which in turn often results in only the outer shell of the particle oxidising, reducing volume change within the anode and hence risk of cracking in the event that the reducing atmosphere of the fuel supply is interrupted. Further, it makes the use of metal supports possible, allowing thinner layers of electrode and electrolyte material to be used, as these play less of a structural role, if any at all.

The application of the green anode layer generally includes an initial application of the ink to the metal substrate, this will typically be by printing, for instance by screen printing, although other methods, such as tape casting, vacuum slip casting, electrophoretic deposition and calendering may be used as would be known to the person skilled in the art. Where a porous region is present, the application of the ink to the substrate will typically be such that a layer is formed over the porous region, but the non-porous region is left substantially uncovered. This ensures that the fuel cannot bypass the anode, but minimises material costs and weight by covering no more of the substrate than necessary.

This initial application will optionally be followed by a step of drying the ink to provide a printed layer. The drying may be air drying, or under gentle heat. Gentle heat is often used to speed up the formation of the printed layer. Temperatures in the range 50 to 150° C. would be typical. The drying step evaporates solvents and sets any binders in any ink formulation used, solidifying the ink and forming an initial, albeit fragile, anode layer, termed here the printed layer. This layer will generally be of thickness in the range 5 to 40 µm, often 7 to 20 µm, often 9 to 15 µm. As the fuel cells of the invention are not anode supported cells, the anode layer can be much thinner than in many conventional fuel cells, which has the advantage that the overall volume change during REDOX cycling is smaller, and so cracking of the anode over time is significantly reduced. The application of the green anode layer may therefore include the steps of initial application of the ink to the metal substrate, and drying the ink to provide a printed layer of thickness in the range 5 to 40 µm.

In many cases, the process of the invention will further comprise the step of compressing the green anode layer at pressures in the range 100 to 300 MPa. This compression step increases the density of the of the unsintered green anode layer, ensuring that the particles of nickel oxide and rare earth-doped ceria are in sufficiently close contact to sinter effectively at the temperatures employed in the process of the invention. However, the use of a compression step is not essential, as firing the anode layer in reducing conditions as defined in firing step c) strongly favours sintering of the rare earth-doped ceria and the nickel oxide, and so it may be that this step is omitted. Where present, it will often be the case that the compression step is used in combination with a step of heating the printed layer to remove residual organic materials from the ink base prior to compression, to leave a green anode layer comprising nickel oxide and a rare earth-doped ceria that may be compressed. A variety of compression methods may be used, as would be known to the person skilled in the art, although often uniaxial or cold isostatic pressing will be used.

The step of pre-firing the green anode layer under non-reducing conditions to form a composite provides for the removal of residual organic components from the ink (if ink is used rather than an alternative carrier), bonds the anode layer to the metallic substrate through the production of a weakly sintered oxide-ceramic structure, and allows a passivation layer to form on the metallic support, protecting the support and providing a diffusion barrier between the anode and the bulk metal. Pre-firing of the green anode layer generally occurs in a furnace at a temperature in the range 950 to 1100° C., often 980 to 1050° C., or 1000 to 1030° C. The upper limit of these ranges is selected on the basis of substrate stability. Above around 1100° C. even high chromium content steels, known for their high oxidation resistance, oxidise in air too rapidly for the substrate to survive the firing process. Specifically, the chromium oxide passivation layer grows and flakes repeatedly during the formation of the anode cermet, weakening the metal substrate to an unacceptable extent. The use of the rare earth-doped ceria facilitates the use of a metal substrate, together with the formation of a robust cermet as ceria compounds may be sintered at temperatures below 1100° C. The lower limit is guided by the need for passivation layer formation and removal of any residual organic matter from the ink.

The pre-firing step will typically be firing in air, although other non-reducing atmospheres may be used. Typically the firing step will be over a period 15 to 60 minutes. Whilst the firing period must be sufficient to allow removal of any residual organic matter from the ink, initial sintering of the oxide-ceramic composite, and to allow the furnace to reach thermal equilibrium; too long a firing period can increase oxidation of the metal support and lead to contamination of the anode with, where ferritic stainless steel is used, chromium evaporating from the support. Hence, the optimal firing period is in the range 15 to 60 minutes.

The process may further comprise the step of bracing the metal substrate during at least one of a heating step selected from: pre-firing the anode, firing the anode, sintering the anode, sintering the electrolyte, sintering the cathode or combinations thereof. Bracing the substrate has the advantage that the substrate cannot distort during heating or under the stresses applied to the substrate as the anode, electrolyte, and/or cathode sinter and shrink. This is particularly important during the heating steps which lead to the formation of the anode, as once the anode cermet is formed, this will help to maintain the substrate conformation. Typically, the substrate will be thick relative to the electroactive layers, and layers of electroactive substances will be formed on the substrate to produce the SOFC, bracing will therefore generally be to keep the substrate flat, and the bracing may be achieved using a wide variety of methods, as would be known to the person skilled in the art. This could include pinning, clamping or weighting of the substrate. Weighting of the substrate would often include the application of a ceramic frame around the edge of the anode.

After pre-firing step b) the composite is fired in a reducing atmosphere as defined in step c). This may be by cooling the composite (adhered to the support) and transferring the composite to a furnace containing the inert atmosphere, or by purging the atmosphere of the furnace used for the pre-firing step and replacing this with the reducing atmosphere desired. This may be achieved in a variety of ways. For instance, where two furnaces are used, the pre-firing furnace may be cooled to ambient temperature, the parts transferred to the second furnace, which before being heated is purged with an inert gas to remove oxygen. During heating of this second furnace to firing temperature, for instance in the temperature range ambient to 500° C., the reducing agent and oxygen source may be introduced into the inert atmosphere. Alternatively, where only one furnace is to be used, after the pre-firing step the atmosphere in the furnace could be changed first from air to an inert atmosphere (such as argon or nitrogen) and then the reducing agent and oxygen source added at a temperature in the range 100 to 1100° C., in some cases in the range 500 to 1050° C., often in the range 900 to 1030° C. It will be understood that the method chosen will depend upon production line considerations and which of the one or two furnace option is more efficient may vary with both fuel cell and factory design.

Firing step c) provides for the reduction of nickel oxide to nickel, this step generally occurs (independently) at temperatures and for residence times similar to those described above for the pre-firing step b). At these temperatures any passivation layer present remains stable, and so oxidation of the metal substrate is not such that the substrate corrodes and the structural integrity of the SOFC weakened. However, the temperatures are sufficient to ensure good sintering of the nickel and rare earth-doped ceria to produce the cermet, which in turn leads to a robust anode, and more stable SOFC. Further, it has been found that residence times in the range 15 to 60 minutes are appropriate to ensure good sintering without unnecessary contamination of the anode with, where ferritic stainless steel is used, chromium evaporating from the support.

Firing and sintering under these conditions ensures that the nickel oxide in the anode reduces to metallic nickel, and enhances sintering of rare earth-doped ceria through increased cation mobility due to partial reduction of $Ce^{4+}$ ions to $Ce^{3+}$ ions. Further, metallic nickel sinters far more readily than nickel oxide at the same temperature, and is also highly ductile, meaning it can easily move to accommodate sintering of the rare earth-doped ceria phase. At this temperature range the sintering of metallic nickel is not excessive (as would be the case at more conventional ceramic sintering temperatures), but a strong porous sintered network of metallic nickel is formed. In conventional anode formation methods, the nickel oxide would not be reduced, but sintered as nickel oxide with the rare earth-doped ceria. The nickel oxide would then be reduced for the first time upon commencement of operation of the cell, resulting in a volume change of the anode and hence possible cracking of the anode and separation from the electrolyte as a result of stresses at the anode-electrolyte interface. Reducing the nickel oxide to nickel and sintering as described above, before the electrolyte is present, dramatically reduces this volume change upon initial operation, and goes a long way to addressing the problem of cracking as described above.

In addition, the process of the invention may further comprise the step of reoxidising the sintered nickel prior to the provision of the electrolyte. This provides for an anodic material which has completed an entire reduction and oxidation cycle, forming a stable microstructure before the electrolyte is applied. As much of the microstructural change in the anode happens in the first REDOX cycle, including this reoxidation step reduces the risk of damaging microstructural changes due to subsequent REDOX cycles in service, or in the case of loss of reducing atmosphere in use (for instance where there is a system failure preventing the fuel from flowing to the cell), oxidation of nickel to nickel oxide at operating temperature as described above.

Reoxidation may be achieved simply by substituting the reducing atmosphere for an oxidising atmosphere; however, it can be beneficial to provide an environment where controlled reoxidation occurs. As such, it can be advantageous to modify the reducing atmosphere of firing step c) by removing the reducing agent, but retaining the inert carrier gas and oxygen source. Under these conditions, the oxygen partial pressure in the furnace rises slowly until it is above the level at which metallic nickel is thermodynamically stable, allowing the nickel in the anode to reoxidise slowly to nickel oxide. The reoxidation step, if present, will generally occur at a temperature below the temperature at which nickel will sinter, and so typically the reoxidation temperature will be in the range of the sintering temperature to 200° C., more often in the range 1000 to 500° C., in many cases in the range 750 to 650° C. Often the reoxidation step will simply be allowed to occur after sintering, during cooling of the furnace, through a change to the atmosphere to remove the reducing agent.

The steps of providing the electrolyte and cathode are steps well known in the art. Typically, the electrolyte for use with the fuel cells of the invention will be of thickness in the range 5 to 30 µm, often in the range 10 to 20 µm. The provision of such a thin electrolyte layer provides for rapid transfer of oxygen ions from the cathode, to the anode. Often the electrolyte will comprise a rare earth-doped ceria, appropriate rare earth cerias being as defined above for the anode.

In some examples, the electrolyte may comprise a rare earth-doped ceria combined with a low level of cobalt oxide, as a sintering aid, for instance, there may be in the range 0.5 to 5 wt % cobalt oxide, the remaining electrolyte being the rare earth-doped ceria. The use of rare earth-doped cerias for both the anode and electrolyte helps to enhance the compatibility between these components of the fuel cell both chemically and in terms of the thermal expansion, which is closely matched reducing the mechanical stress between layers during REDOX cycling, and hence also reducing the likelihood of cracking and fuel cell failure in use. Further, as these cerias have high charge transfer rates, their inclusion ensures a good rate of charge transfer between the electrolyte and the anode.

The electrolyte will generally be sintered in a separate firing step after the anode is fully formed, and optionally after the nickel has been reoxidised to nickel oxide.

Typically the cathode will be of thickness in the range 30 to 60 μm, often 40 to 50 μm. The cathode will generally comprise two layers, a thin active layer where the reduction of oxygen takes place, and a thicker current collector layer, to allow the current to be collected from a cell in the stack. The current collector layer will generally be a perovskite such as lanthanum strontium cobaltite, although any electronically conductive ceramic material may be used.

The active layer cathode may comprise a sintered powdered mixture of perovskite oxide mixed conductor and rare earth-doped ceria, the rare earth-doped ceria being as defined above. The perovskite may comprise $La_{1-x}Sr_x$-$Co_yFe_{1-y}O_{3-\delta}$, where $0.5 \geq x \geq 0.2$ and $1 \geq y \geq 0.2$. In particular, the perovskite oxide mixed conductor may comprise one or more of $La_{0.6}Sr_{0.4}CO_{0.2}Fe_{0.8}O_{3-\delta}$, $Gd_{0.5}CoO_{3-\delta}$, and $RE_xSr_{1-x}CoO_{3-d}$, (where RE=La, Sm, Pr and $0.5<x<0.8$). It can be useful to use these compounds as they have a higher ionic conductivity than most perovskites. In some cases, the mixture comprises in the range 20 to 50 wt % rare earth-doped ceria, in some cases 30 to 45 wt %, in some cases 35 to 45 wt %, or around 40 wt % rare earth-doped ceria as defined above. This helps to enhance the compatibility between the cathode and electrolyte both chemically and in terms of the thermal expansion described above, and as these cerias have high charge transfer rates, their inclusion ensures a good rate of charge transfer between the electrolyte and the cathode.

The cathode will generally be sintered before use. The cathode will typically be applied as one or more layers (for instance active and current collecting) directly or indirectly over the sintered electrolyte and sintered under conditions similar those described above for the anode. This provides an intermediate temperature metal supported SOFC, which is robust to repeated REDOX cycling, and as a result of the anode structure formed, to fuel depravation whilst at high temperature.

In a second aspect of the invention there is provided a metal supported solid oxide fuel cell formed by a process according to the first aspect of the invention.

In some instances, the fuel cell will be a fuel cell of the type described in the applicants granted patent GB 2 368 450, which is incorporated herein by reference. In such cases, the fuel cell may comprise:

(i) a ferritic stainless steel support including a porous region and a non-porous region bounding the porous region;

(ii) a ferritic stainless steel bi-polar plate located under one surface of the porous region of the support and being sealingly attached to the non-porous region of the support about the porous region thereof;

(iii) an anode comprising an anode layer located over the other surface of the porous region of the support;

(iv) an electrolyte comprising an electrolyte layer located over the anode layer; and (v) a cathode comprising a cathode layer located over the electrolyte layer;

wherein the anode includes nickel and a rare earth-doped ceria and wherein the fuel cell has been formed by a process according to the first aspect of the invention.

The fuel cell may be present in a fuel cell stack, comprising two or more fuel cells, and there is therefore provided in a third aspect of the invention, a fuel cell stack comprising fuel cells according to the second aspect of the invention. Each fuel cell may comprise a bi-polar plate, as described above, to which the support may be welded, or otherwise sealed.

In a fourth aspect of the invention there is provided the use of a fuel cell according to the second aspect of the invention, in the generation of electrical energy.

The process of the invention is intended to provide a method for the manufacture of a highly sintered nickel-rare earth-doped ceria thick film anode suitable for use in a metal supported SOFC cell, whilst avoiding the problems of poor anodic sintering, degradation of the support, and delamination of the electrolyte in use. It may be the case that the process is a process for forming a metal supported solid oxide fuel cell, the process comprising the steps of:

a) applying a green anode layer including nickel oxide and a rare earth-doped ceria (optionally both powdered, and optionally of particle size distribution d90 in the range 0.2 to 3 μm) optionally in the form of an ink to a metal substrate;

b) optionally, drying the ink to provide a printed layer of thickness in the range 5 to 40 μm;

c) optionally, compressing the green anode layer at pressures in the range 100 to 300 MPa;

d) optionally, bracing the metal, optionally for the steps of prefiring the anode layer and firing the composite, optionally by weighting the metal support;

e) prefiring the anode layer under non-reducing conditions (optionally in air) to form a composite optionally at a temperature in the range 950 to 1100° C.;

f) firing the composite in a reducing atmosphere to forma sintered cermet, wherein the atmosphere optionally comprises an inert gas, a gaseous reducing agent and a gaseous oxygen source, the reducing agent optionally comprising 0.5 to 50 volume % hydrogen, the oxygen source optionally comprising 0.01 to 50 volume % water vapour and the inert gas optionally comprising argon; wherein the firing of the composite optionally occurs at a temperature in the range 950 to 1100° C. and the firing conditions optionally provide for reduction of the nickel oxide to nickel metal prior to sintering of the nickel containing component g) optionally, reoxidising the sintered nickel prior to the provision of the electrolyte;

h) providing an electrolyte; and i) providing a cathode.

The use of the processes described herein provide for a SOFC which because of the anodic structure is highly REDOX stable at intermediate operating temperatures (less than 650° C.), the SOFC being capable of withstanding hundreds of high temperature fuel interruptions without significant cell performance degradation.

Unless otherwise stated each of the integers described in the invention may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

BRIEF DESCRIPTION OF THE DRAWINGS

In order that the present invention may be more readily understood, it will be described further with reference to the figures and to the specific examples hereinafter.

FIG. 13 is a table of the results of mechanical strength tests undertaken on SOFC cells both after initial manufacture and after cells have operated in an initial performance characterisation test, for both standard nickel-CGO anodes as illustrated in FIG. 2, and reduced fired nickel-CGO anodes as illustrated in FIG. 8

DETAILED DESCRIPTION

Figure 1:
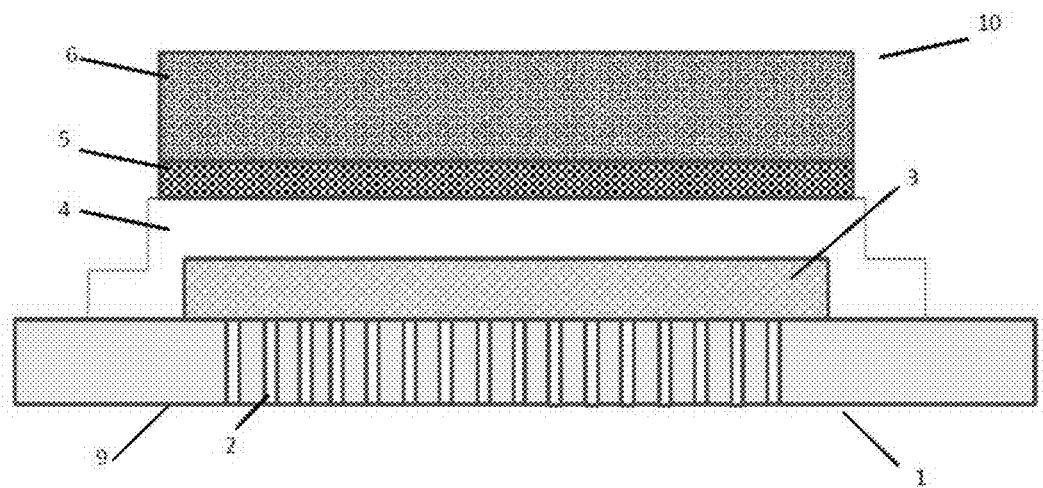
FIG. 1 is a schematic representation of a SOFC as described in GB 2 368 450.
Figure 2:
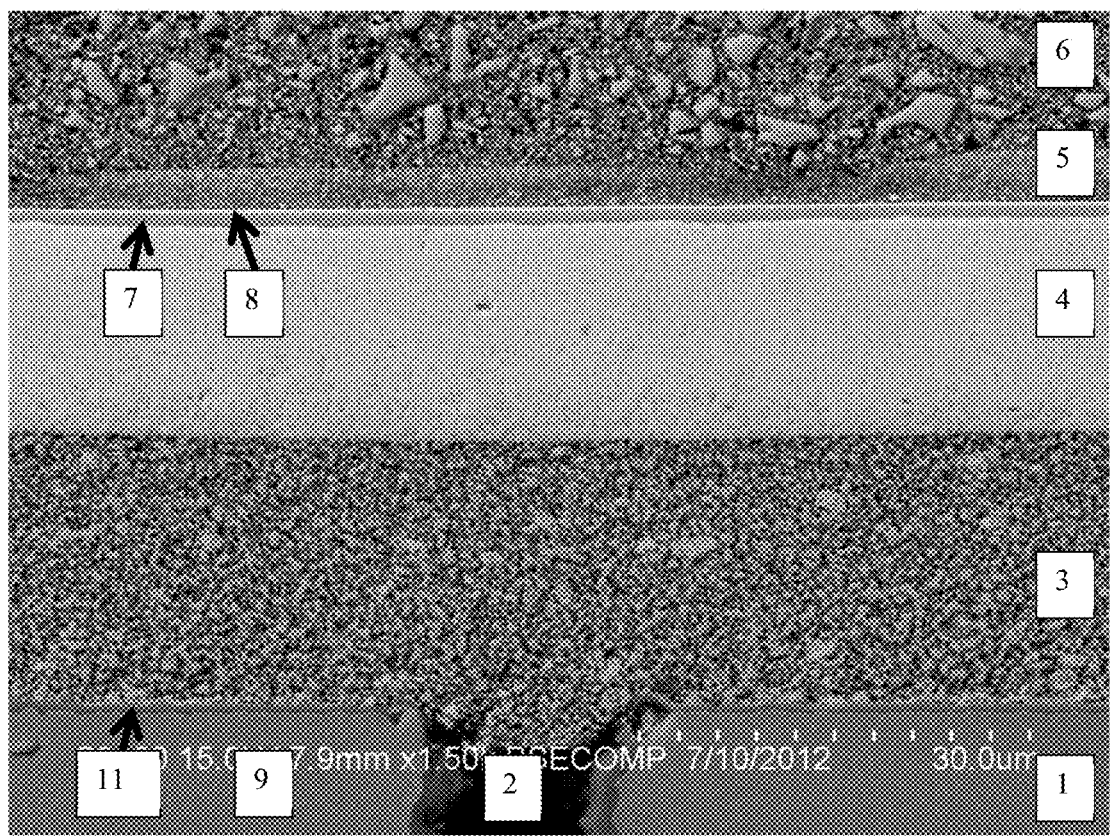
FIG. 2 is a scanning electron micrograph (SEM) showing a cross section through a SOFC of FIG. 1 (15.0 kV, 7.9 mm×1.50 k)

A SOFC 10 as described in GB 2 368 450 is shown schematically in FIG. 1, and in SEM cross-section in FIG. 2. Both figures show a ferritic stainless steel substrate 1, made partially porous by laser-drilling thousands of holes though the central region of the substrate 2. The porous substrate includes a chromium oxide passivation layer 11, a nickel oxide and CGO anode layer 3 covering the porous region 2 of the substrate 1. Over the anode layer 3 is deposited a CGO electrolyte layer 4 (10 to 20 µm, CGO), which overlaps the anode 3 onto the undrilled area 9 of the substrate 1, thus forming a seal around the edge of the anode 3. The cathode 5,6 has a thin active layer 5 (CGO composite) where the reduction of oxygen takes place, and a thicker current collector layer 6 (lanthanum strontium cobaltite) to allow current to be collected from the cell 10 in a stack. FIG. 2 additionally shows a very thin stabilised zirconia layer 7 and an even thinner doped ceria layer 8, which block electronic conductivity (preventing short circuiting from undesirable chemical reactions between the cathode 5,6 and zirconia layer 7) and form the interface between the anode and electrolyte respectively.

SOFC 10 of FIGS. 1 and 2 was prepared by applying a screen-printing ink containing suspended particles of nickel oxide powder and CGO powder (d90=0.7 to 1.2 µm, ratio of nickel oxide to CGO in the ink being 1:0.55 by weight). The ink was screen printed onto ferritic stainless steel substrate 1 using conventional methods, and dried in an oven to evaporate the solvents and set the binders thereby forming a dried, printed layer of thickness 9 to 15 µm. The dried, printed layer was compressed using cold isostatic pressing at pressure of 300 MPa. The green anode layer was placed in a furnace and heated to a temperature of 960° C. in air atmosphere for 40 minutes, to produce a sintered anode layer 3. A CGO electrolyte layer 4 was sprayed onto the anode layer 3 and fired in a furnace at 1020° C. for 40 minutes. Finally, zirconia layer 7 was applied to the fired electrolyte layer by means of the method disclosed in GB 2 456 445 followed by application of the doped ceria layer 8 and the two cathodic layers 5,6 also using the methods of GB 2 456 445, before firing at a temperature of 825° C. to produce the SOFC 1 structure.

Figure 10:
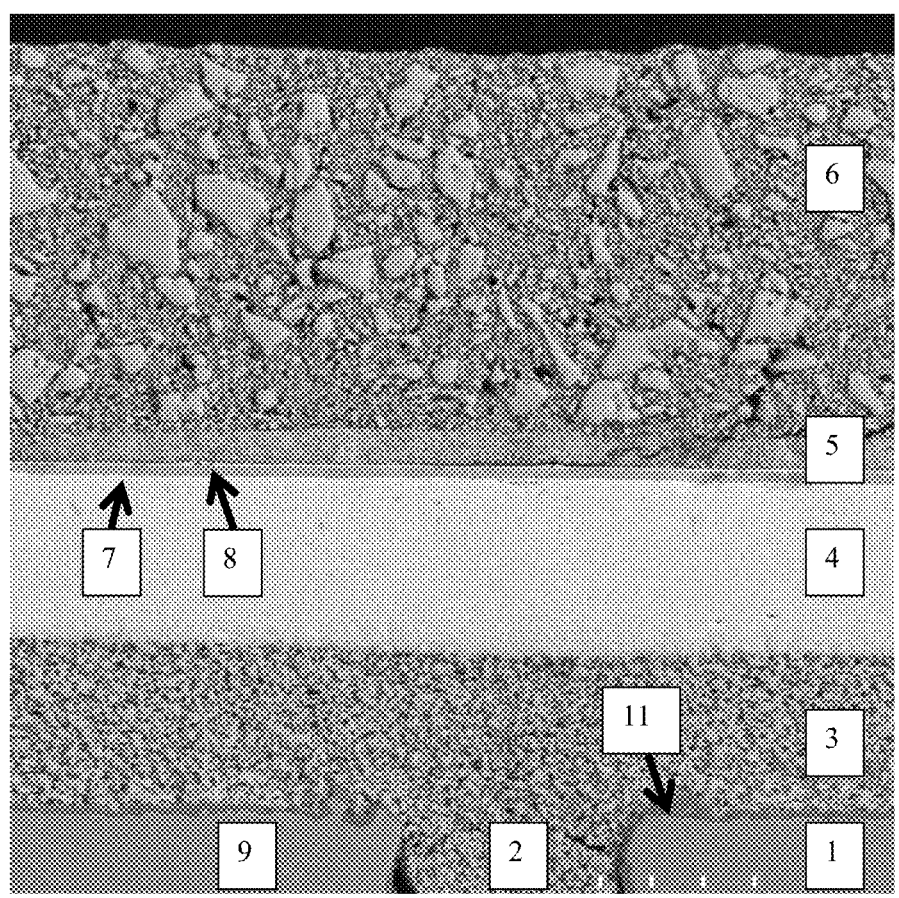
FIG. 10 is a SEM showing a cross section through a SOFC made using the process of the invention.

In contrast the SOFC 10 of the invention, whilst appearing to have a similar structure to the SOFC 10 of FIGS. 1 and 2, is prepared in a different way and (as shown in FIGS. 7 to 10) exhibits a good sintering of the nickel oxide phase, a porous anode structure and a contiguous chromium oxide passivation layer 11, between the support 1 and the anode 3. In FIG. 10 the electrolyte layer 4, cathodic layers 5,6, zirconia layer 7 and doped ceria layer 8 are also shown.

The SOFC of FIGS. 7 to 10 is prepared by applying screen printed ink containing suspended particles of nickel oxide powder and CGO powder (d90=0.7 to 1.2 µm, ratio of nickel oxide to CGO being 1:0.78). The ink was screen printed onto a ferritic stainless steel substrate using conventional methods and dried to evaporate the solvents and set the binders thereby forming a dried, printed layer of thickness 9 to 15 µm. The dried printed layer was fired in air at a temperature of 1020° C. for 40 minutes to produce a sintered anode layer 3. The furnace was then allowed to cool to room temperature and the air purged from the system using a 5% hydrogen/argon mix.

An atmosphere comprising 4.85 volume % hydrogen, 2.91 volume % water vapour, the remainder being argon was introduced and the furnace heated to 1045° C. The water vapour was introduced into the dry mixture of hydrogen and argon by bubbling the hydrogen and argon mixture through deionised water resulting in an oxygen partial pressure in the reducing atmosphere in the range $10^{-17}$ to $10^{-19}$ bar. The composite was fired in this atmosphere and at this temperature for a time period of 40 minutes allowing reduction of nickel oxide to metallic nickel and sintering of the nickel and rare earth-doped ceria to form a cermet.

After 40 minutes the furnace was allowed to cool and the atmosphere switched to nitrogen bubbled through deionised water. This allowed the partial pressure of oxygen to rise to above $10^{-13}$ bar, leading to oxidation of nickel metal to nickel oxide.

After cooling completely, the anode was re-oxidised by heating it in a furnace in air to 700° C. for 60 min.

The sintered anode 3 was then treated as described above for FIGS. 1 and 2 in order to form a complete solid oxide fuel cell comprising CGO electrolyte layer 4, zirconia layer 7, doped ceria layer 8, and two cathodic layers 5,6.

EXAMPLES

Nickel Oxide and Chromium Oxide Stabilities

The stability of nickel, nickel oxide, chromium, and chromium oxide are of interest in the systems of the invention, as the reduction of nickel oxide to nickel is a key to the functioning of the anode. The formation and preservation of the passivation layer on the SOFC support, which will typically be chromium oxide as ferritic stainless steel substrates are the substrates most commonly used, is important to the prevention of diffusion between the support and the anode, which can potentially contaminate both the anode, reducing it's efficiency, and the support, forming austenitic phases and reducing the supports structural integrity. In addition, the passivation layer prevents degradation of the support during the firing steps used in formation of the fuel cell, and then in use.

Figure 3:
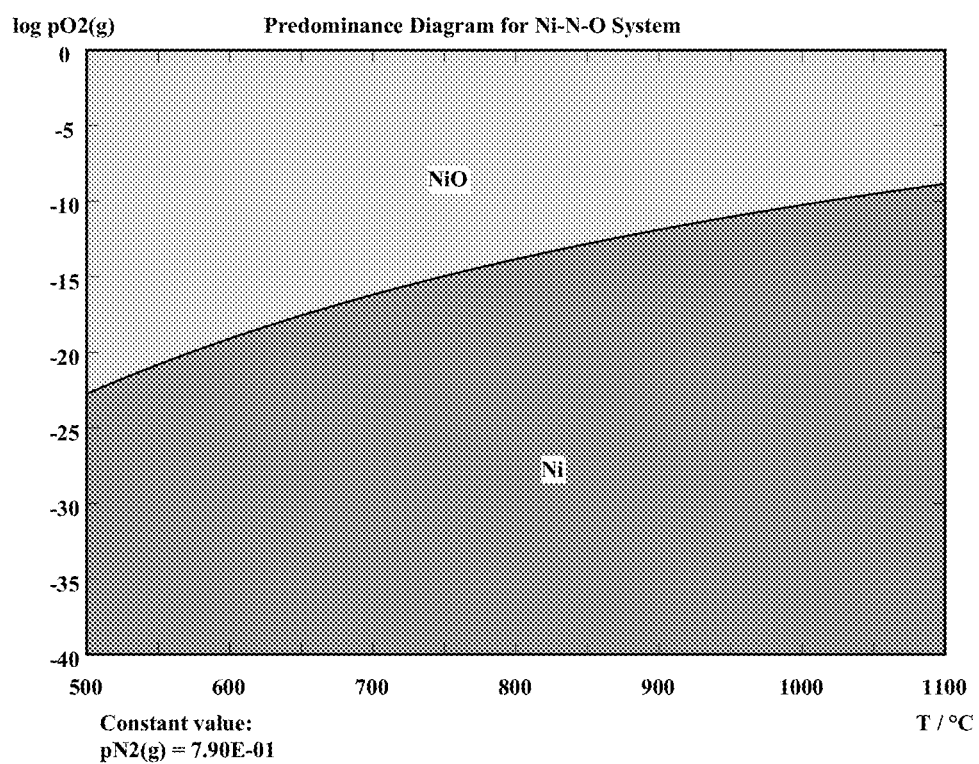
FIG. 3 is a thermodynamic phase diagram for a nickel/nickel oxide system covering the temperature range 500 to 1100° C. and oxygen partial pressures in the range log $pO_2$ 0 to −40.

FIG. 3 shows a thermodynamic phase diagram for a nickel/nickel oxide system showing the limits of thermodynamic stability of metallic nickel as a function of temperature and oxygen partial pressure. It can be seen that at 1000 to 1100° C., the metallic nickel is stable at an oxygen partial pressures as high as $10^{-13}$ to $10^{-14}$ bar. Therefore, at these and lower partial pressures of oxygen, nickel oxide will reduce to metallic nickel.

Figure 4:
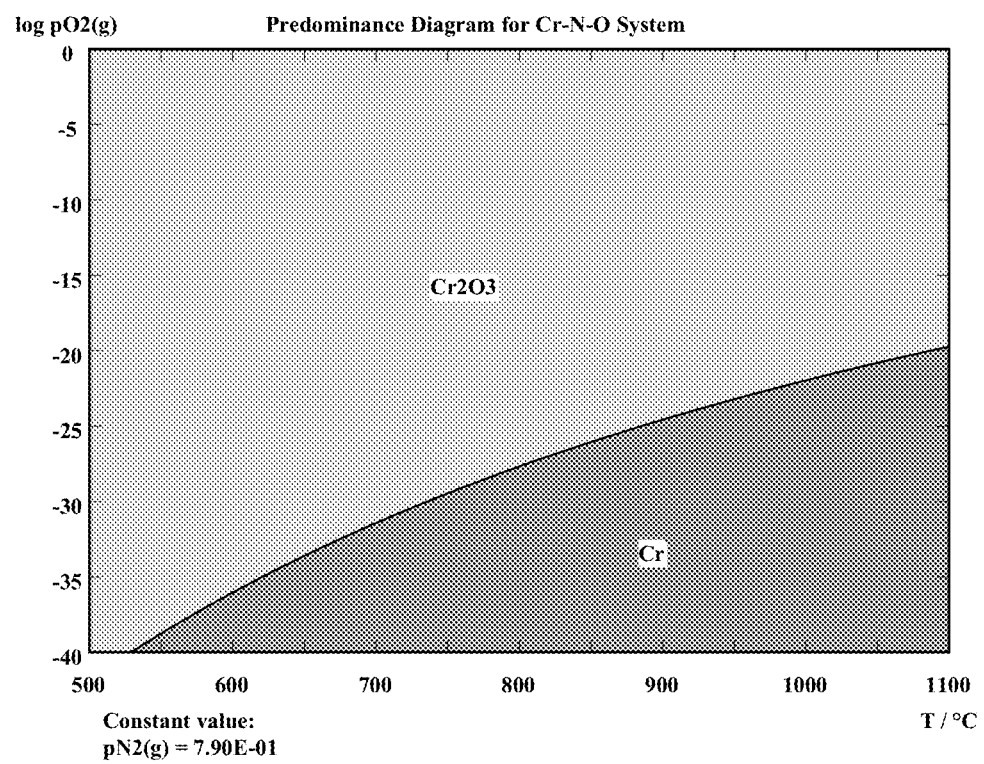
FIG. 4 is a thermodynamic phase diagram for a chromium/chromium oxide system covering the temperature range 500 to 1100° C. and oxygen partial pressures in the range of log $pO_2$ 0 to −40.

FIG. 4 shows the equivalent phase diagram for a chromium/chromium oxide system showing that at 1000 to 1100° C., metallic chromium is only stable at oxygen partial pressures of $10^{-22}$ to $10^{-24}$ bar or below. Therefore, at oxygen partial pressures above around $10^{-22}$ bar a chromium oxide passivation layer will be retained.

Figure 5:
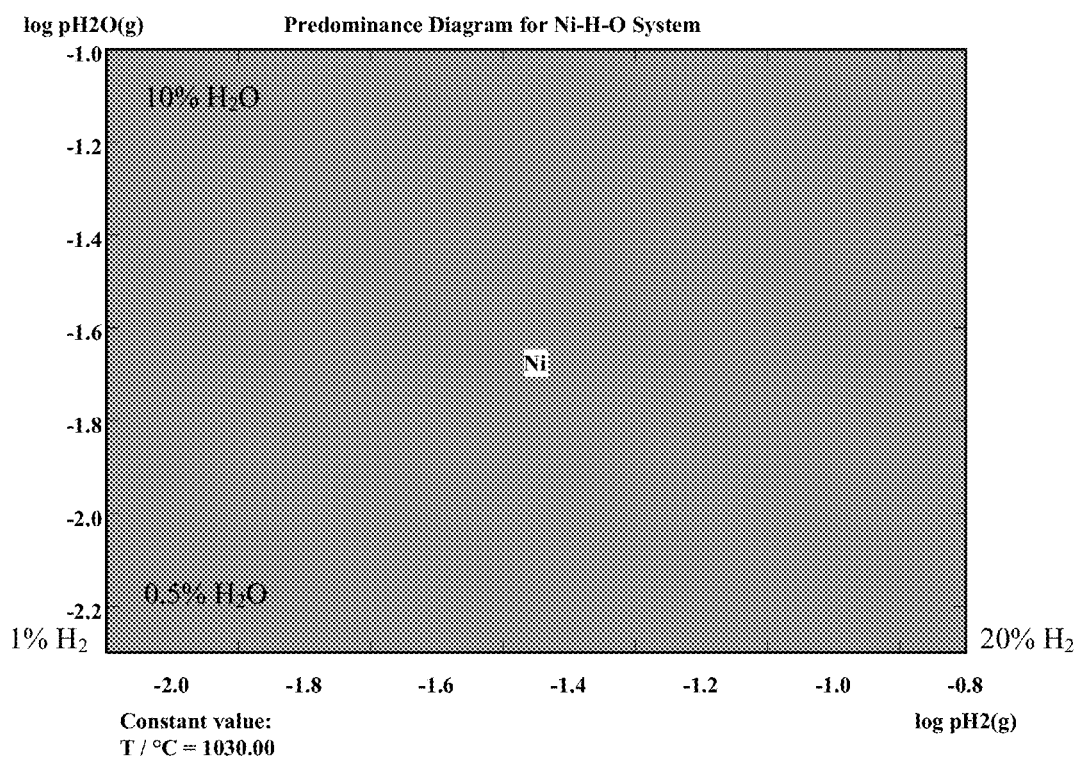
FIG. 5 is a thermodynamic phase diagram for a nickel/nickel oxide system at 1030° C. and 1 bar total pressure as a function of hydrogen and steam partial pressures.

FIG. 5 shows a phase diagram for the nickel/nickel oxide system at 1030° C. and 1 bar total pressure as a function of hydrogen and steam partial pressures, showing that any gas mixture containing 0.5-10% water vapour and 1-20% hydrogen is sufficiently reducing that the only stable phase is metallic nickel.

Figure 6:
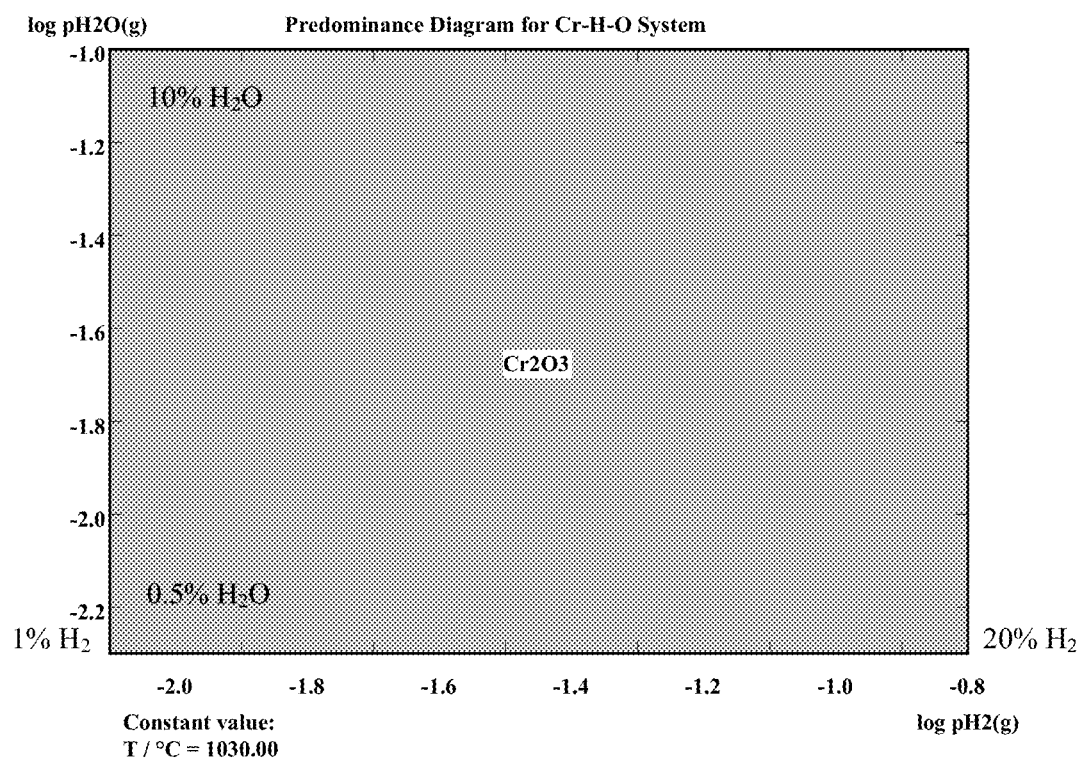
FIG. 6 is a thermodynamic phase diagram for a chromium/chromium oxide system at 1030° C. and 1 bar total pressure as a function of hydrogen and steam partial pressures.

FIG. 6 shows the equivalent phase diagram for the chromium/chromium oxide system showing that for the same range of gas mixtures the only thermodynamically stable phase is chromium oxide.

SOFC Structure

Figure 7:
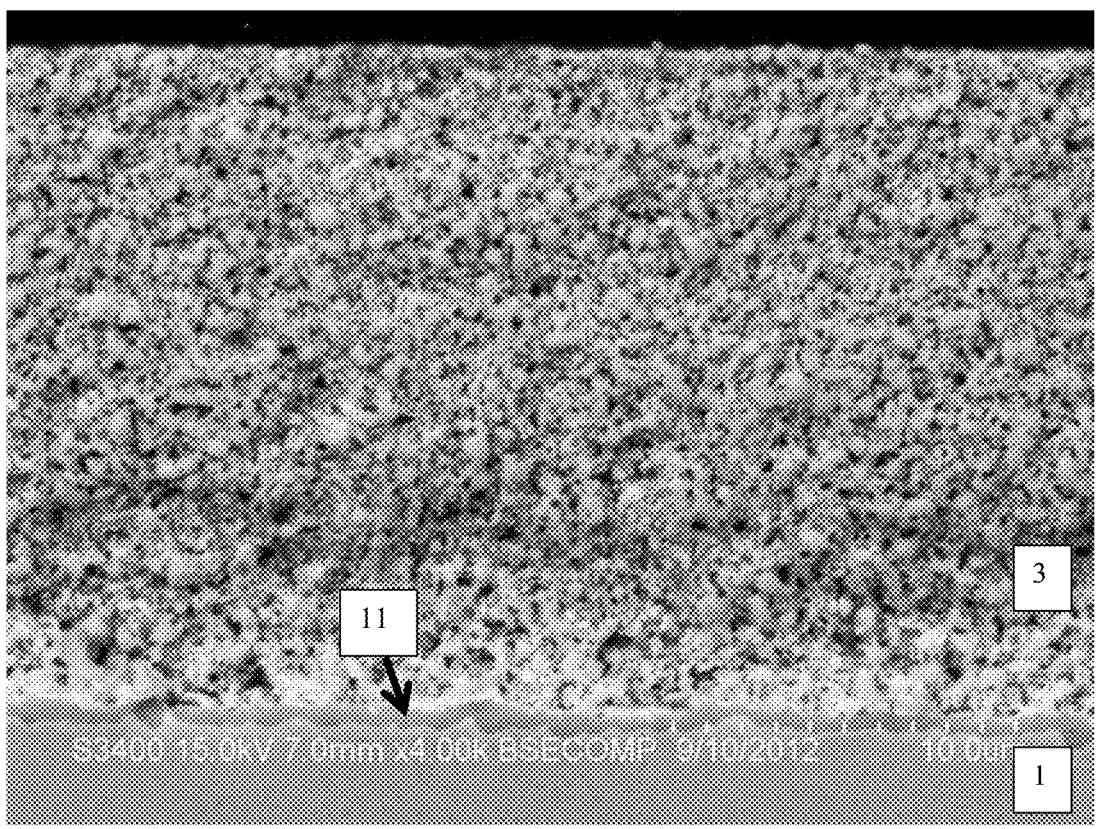
FIG. 7 is a SEM showing a cross-section through a metallic support and anode of an SOFC of the invention after pre-firing in air (15.0 kV, 7.0 mm×4.0 k)
Figure 8:
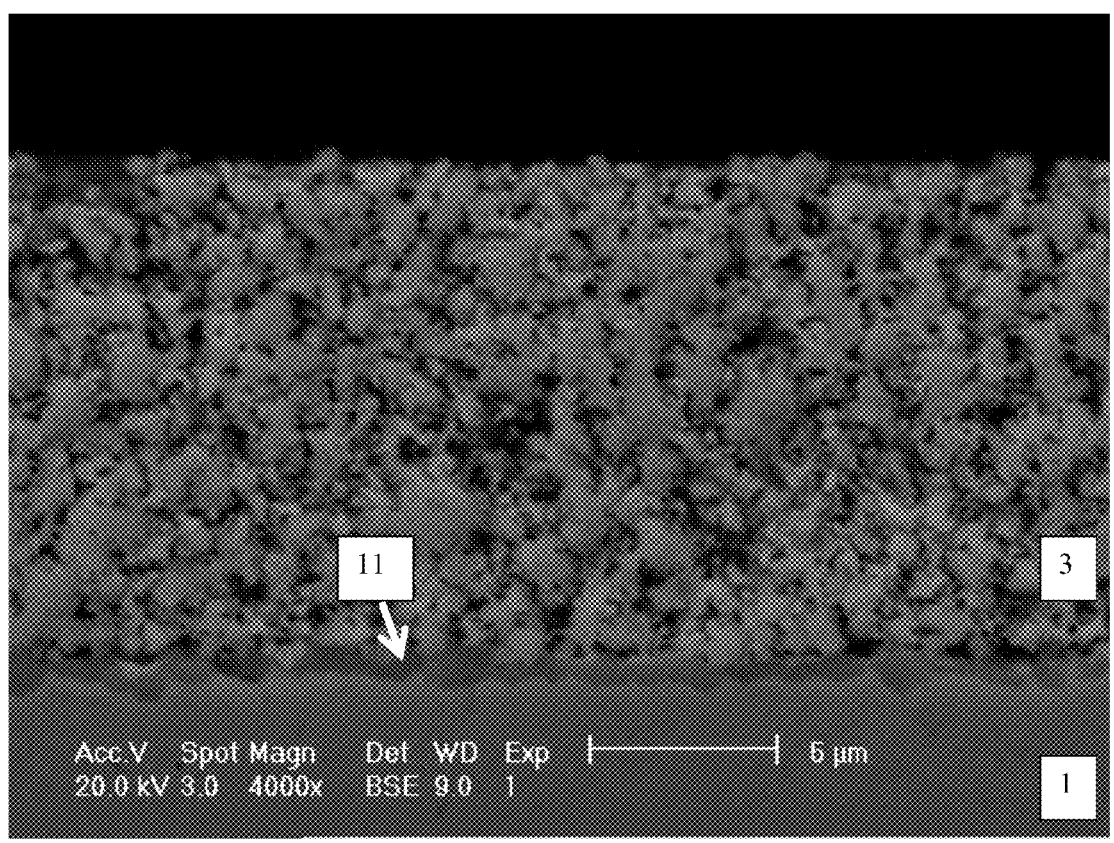
FIG. 8 is a SEM also showing a cross-section through the metallic support and anode of firing in the reducing hydrogen atmosphere and reoxidation as described below (20.0 kV, 4000×)
Figure 9:
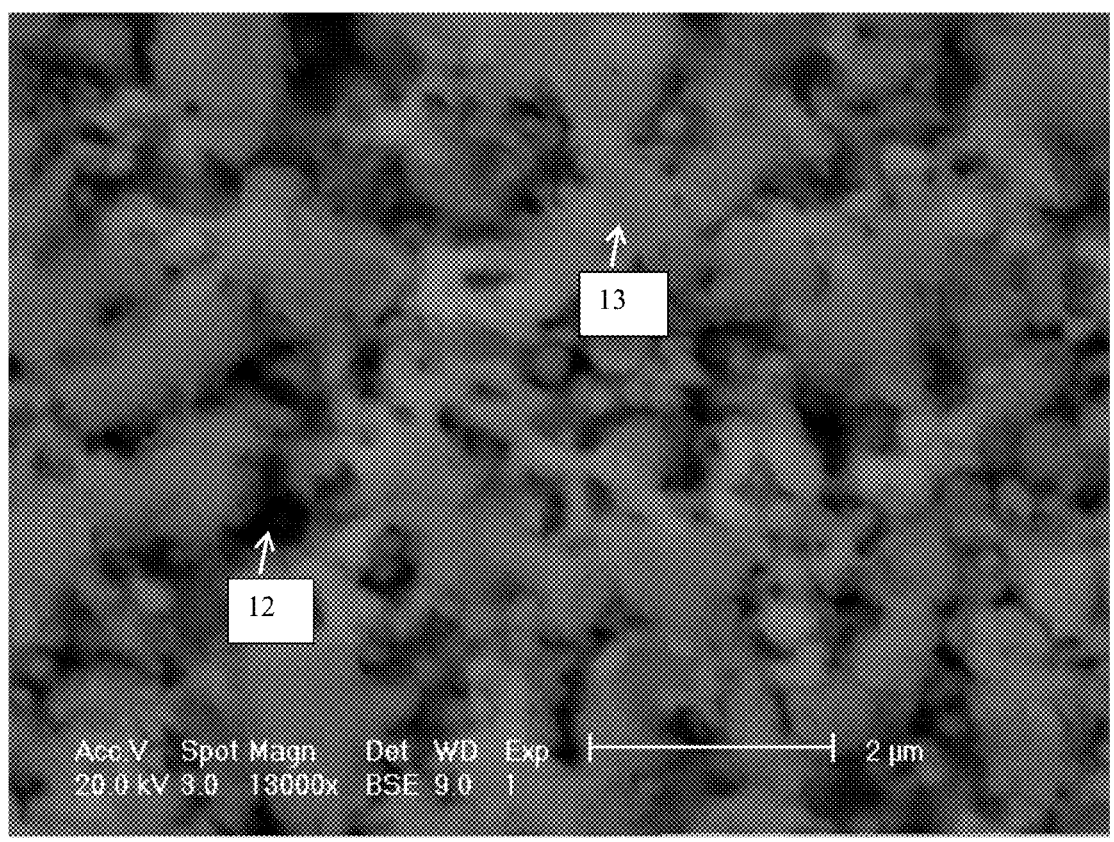
FIG. 9 is a SEM showing the cross-section of FIG. 8 at higher magnification (20.0 kV, 13000×)

FIG. 7 shows a SEM cross-section of an anode 3 produced by the method described herein, after the initial firing in air. This image shows the ferritic stainless steel substrate 1, a thermally grown chromium oxide scale 11 on the substrate 1, and a weakly sintered porous anode structure 3 consisting of nickel oxide (dark phase—45 volume %) and CGO (light phase—55 volume %). FIG. 8 is a cross-section of this anode 3 after firing in the reducing atmosphere subsequent reoxidation, and FIG. 9 a higher magnification image of the same anode 3 microstructure. These figures show that the chromium oxide passivation layer 11 remains intact after firing, and that a good sintering of both the nickel oxide phase 12 and the lighter CGO phase 13 is present. Good sintering is evidenced by a clear distinction between ceramic and metallic regions. The ceramic regions appearing as light regions and the metallic regions as dark patches.

FIG. 10 shows a complete SOFC cell 10 with an anode 3 produced by the method described herein after operation of the fuel cell 10. The anode structure 3 can be seen after reduction of the nickel oxide in the anode 3 back to metallic nickel during SOFC operation, along with the other parts of the SOFC 10 as described above.

The resulting anode structure has been demonstrated to be highly REDOX-stable at operating temperatures of <650° C., being capable of withstanding hundreds of high-temperature fuel interruptions without significant cell performance degradation.

SOFC Performance

Figure 11:
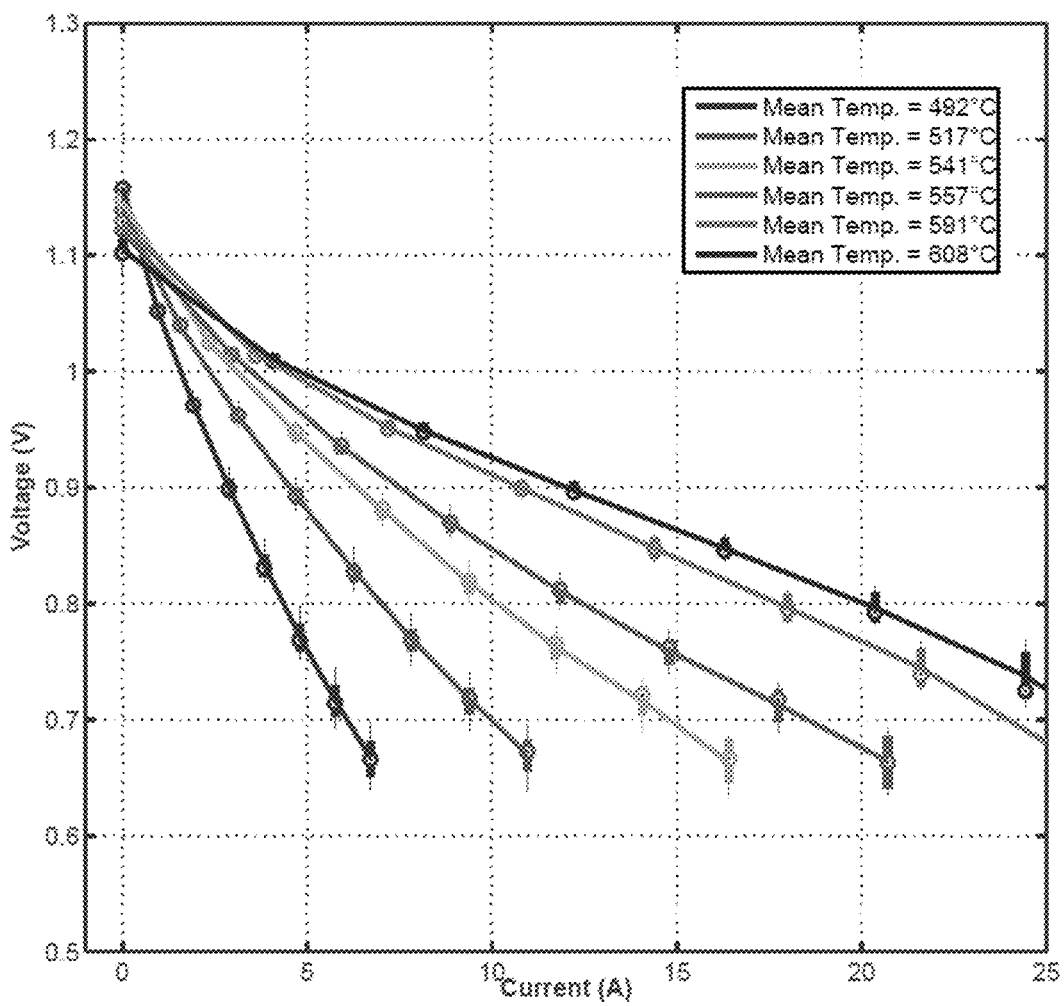
FIG. 11 is a current-voltage curve for the SOFC of FIG. 10 as a function of cell operating temperature (56% hydrogen-44% nitrogen fuel, excess air fed to cathode)

FIG. 11 is a current-voltage polarisation curve for the fuel cell of FIG. 10, at different operating temperatures. Fuelling rate was calculated to give approximately 60% fuel utilisation at 0.75V/cell at each of the measured temperatures, showing that the system can be operated across a range of temperatures at least as broad as 492 to 608° C., allowing the operational temperature to be optimised for application, number of cells in the stack, output required etc.

Figure 12:
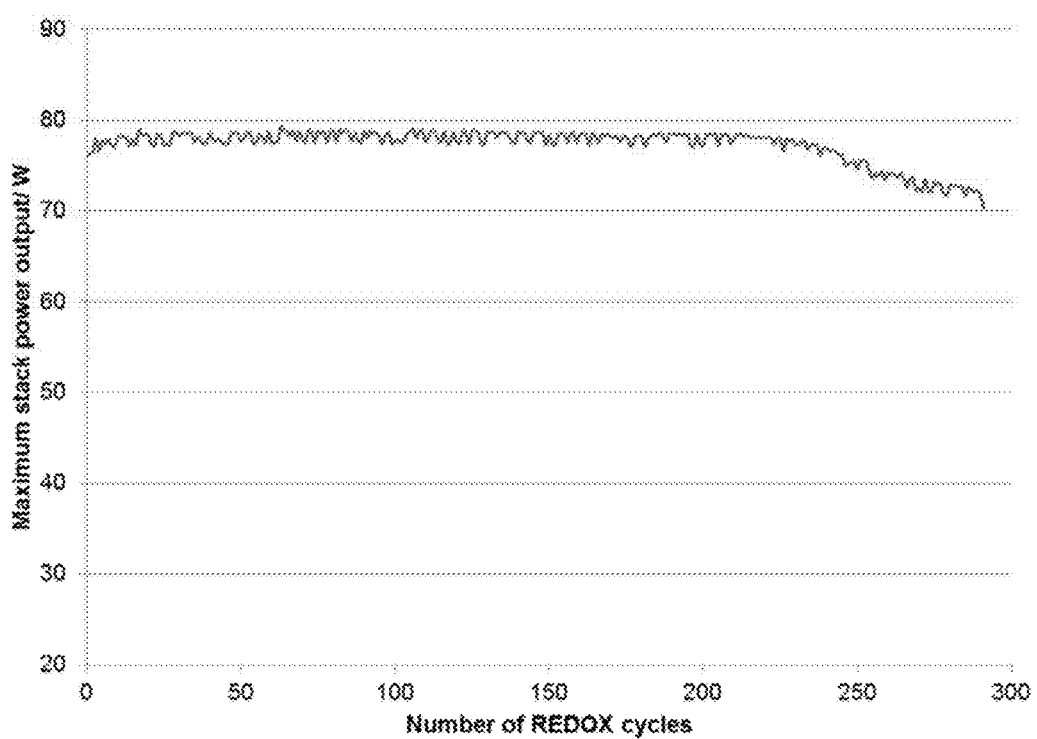
FIG. 12 is a power-cycle graph of the SOFC of FIG. 10.

FIG. 12 shows the very good REDOX stability possible with this anode structure. A series of cycles are run at 600° C. on a seven-layer short stack, where a current-voltage curve is run to establish the stack performance. The stack is then returned to open circuit, and the hydrogen supply to the stack is cut whilst maintaining the stack at 580-600° C. Air and nitrogen are maintained to the stack during this period. The fuel interruption is sustained for 20 minutes, allowing time for the anode to partially reoxidise. The hydrogen feed is then restored, and after giving the stack a few minutes to recover, another current-voltage curve is run to determine if stack performance has been lost as a result of the REDOX cycle of the anode. This sequence continues until stack performance starts to fall, indicating damage to one or more cells as a result of REDOX cycling.

It can be seen from FIG. 12 that with the SOFC cell of FIG. 10, the seven cells within the stack will tolerate more than 200 REDOX cycles without any measurable loss of performance after a small initial burn-in, with 291 cycles being run in total. A loss of performance observed after 200 cycles was in this instance was due to the failure of one cell at the bottom of the stack; it is believed that mechanical optimisation of the stack design can avoid failure of that layer leading to even greater REDOX stability.

FIG. 13 is a table of the results of mechanical strength tests undertaken on SOFC cells both after initial manufacture and after cells have operated in an initial performance characterisation test, for both standard nickel-CGO anodes as illustrated in FIG. 2, and reduced fired nickel-CGO anodes as illustrated in FIG. 8. The after operating test for the reduced fired nickel CGO anodes included over 250 REDOX cycles.

In the as-manufactured cells, the anodes are in the oxidised state and prior to the mechanical test they are reduced in order to mimic the anode structure in the cell at the start of operating, whereas the anodes in the after operating cells are in the final cermet state of the working anodes.

In order to perform the mechanical strength measurement on the cells, the metal substrates of the cells are first glued to a flat steel plate to prevent the cells flexing when a pulling force is applied. The cathodes of the cells are removed mechanically, exposing the electrolyte.

To assess the mechanical strength of the anode and/or the anode-electrolyte bond, circular metal test pieces are glued to the electrolyte surface in the four corners of the electrolyte and the middle of the cell. A diamond scribe is used to cut through the ceramic layers of the cell around the metal test piece. A calibrated hydraulic puller is then attached to the test piece and used to measure the stress required to pull the test piece off the cell substrate. A maximum pulling stress of 17 MPa may be applied using this technique, after which the glue holding the test piece to the electrolyte tends to fail rather than the fuel cell layers on test. Should the test piece be pulled off at less than 17 MPa this indicates the failure stress of the weakest cell layer (usually the internal structure of the anode).

It can be seen that whilst the standard nickel-CGO anodes are strong in the as-manufactured state, they fail at much lower stresses after reduction of the nickel oxide to metallic nickel in the after operating cell. Without being bound by theory, it is believed this is largely because of the lack of a contiguous ceramic structure within the anode, meaning the mechanical strength of the anode is provided entirely by relatively weak necks between nickel particles. By contrast it can be seen that the reduced fired nickel-CGO anodes retain their strength after reduction to the cermet structure, indicating much greater sintering of both metallic and ceramic phases.

It should be appreciated that the processes and fuel cells of the invention are capable of being incorporated in the form of a variety of embodiments, only a few of which have been illustrated and described above.

The invention claimed is:

1. A process for forming a metal supported solid oxide fuel cell, the process comprising the steps of:
    a) applying a green anode layer including nickel oxide and a rare earth-doped ceria to a metal substrate;
    b) thereafter, prefiring the green anode layer under non-reducing conditions to form a composite and a passivation layer interposed between the composite and the metal substrate;
    c) thereafter, firing the composite in a reducing atmosphere to form a sintered cermet, form nickel metal, maintain the rare earth-doped ceria in a partially-reduced state, and retain the passivation layer, wherein the reducing atmosphere comprises a reducing agent and an oxygen source, and wherein an oxygen partial pressure in the reducing atmosphere is in the range $10^{-14}$ to $10^{-22}$ bar;
    d) thereafter, providing an electrolyte; and
    e) thereafter, providing a cathode.

2. The process according to claim 1, wherein the reducing agent is a gaseous reducing agent, and wherein the oxygen source is a gaseous oxygen source, and further wherein the reducing atmosphere of firing step c) comprises an inert gas.

3. The process according to claim 2, wherein the reducing agent is selected from hydrogen, carbon monoxide and combinations thereof.

4. The process according to claim 2, wherein the gaseous oxygen source is selected from carbon dioxide, water vapour and combinations thereof.

5. The process according to claim 2, wherein the reducing atmosphere of firing step c) comprises in the range 0.01 to 50 volume % of the oxygen source and/or 0.5 to 50 volume % reducing agent.

6. The process according to claim 1, wherein in firing step c) the nickel oxide is reduced to nickel metal prior to sintering.

7. The process according to claim 1, wherein in firing step c) the nickel oxide is at least partially sintered prior to reduction to nickel metal.

8. The process according to claim 1, wherein at least one of the prefiring of the green anode layer and the firing of the composite occurs at a temperature in the range 950° C. to 1100° C.

9. The process according to claim 1, comprising bracing the metal substrate during at least one of a heating step selected from: prefiring the green anode layer, firing the composite, or combinations thereof.

10. The process according to claim 1, wherein the nickel oxide and rare earth-doped ceria are powdered, the powders being of particle size distribution d90 in the range 0.1 to 4 μm.

11. The process according to claim 1, wherein the nickel oxide and rare earth-doped ceria are applied as an ink.

12. The process according to claim 11, wherein the application of the green anode layer includes an initial application of the ink to the metal substrate, and drying the ink to provide a printed layer of thickness in the range 5 to 40 μm.

13. The process according to claim 1, further comprising a step of compressing the green anode layer at pressures in the range 100 to 300 MPa.

14. The process according to claim 1, further comprising the step of reoxidising the sintered nickel prior to the provision of the electrolyte.

15. A metal supported solid oxide fuel cell formed by the process according to claim 1.

16. A fuel cell stack comprising two or more fuel cells according to claim 15.

17. The process according to claim 1, wherein the rare earth-doped ceria has the formula $Ce_{1-x}RE_xO_{2-x/2}$, wherein RE is a rare earth and $0.3 \geq x \geq 0.5$.

* * * * *